United States Patent [19]

Espenscheid

[11] 4,364,918
[45] Dec. 21, 1982

[54] SEPARATION OF THIOSULFATE FROM STRETFORD SOLUTION

[75] Inventor: Wilton F. Espenscheid, De Soto, Tex.

[73] Assignee: Mobil Oil Corporation, New York, N.Y.

[21] Appl. No.: 17,636

[22] Filed: Mar. 5, 1979

[51] Int. Cl.³ .............................................. C01B 17/04
[52] U.S. Cl. .................................. 423/573 R; 423/226
[58] Field of Search .................... 423/226, 232, 573 G

[56] References Cited

U.S. PATENT DOCUMENTS 3,959,452 5/1976 Espenscheid et al. ........... 423/226 X

OTHER PUBLICATIONS

Gast et al.; "J.A.C.S"; vol. 23, Jul. 1951; pp. 3037–3039.
"Chemical Abstracts", vol. 47; 1953, p. 438d.

Primary Examiner—G. Peters
Attorney, Agent, or Firm—Charles A. Huggett; Michael G. Gilman; Thomas S. Szatkowski

[57] ABSTRACT

A thiosulfate-containing purge stream generated in a Stretford-type process for purifying a hydrogen sulfide contaminated gas stream is treated with a nickel ethylenediamine complex to remove thiosulfate as a nickel ethylenediamine thiosulfate precipitate. The precipitate is treated with acid to decompose the thiosulfate and then with lime to recover the nickel ethylenediamine complex for reuse.

1 Claim, 1 Drawing Figure

SEPARATION OF THIOSULFATE FROM STRETFORD SOLUTION

BACKGROUND OF THE INVENTION

1. Field of the Invention

This invention is concerned with the purification of sulfur-contaminated gas streams. It is particularly concerned with an improved process for removing low concentrations of hydrogen sulfide contaminant in a waste gas stream by contact with a regenerable, reactive aqueous sorbent, the improvement residing in a novel treatment of sorbent degraded by excess thiosulfate content. The novel treatment recovers chemical values and mitigates disposal problems.

2. Prior Art

Low concentrations of sulfur contaminants occur in gas streams such as natural gas, coke oven gas, and the tail gas from the Claus process. These contaminants are usually undesirable for one reason or another. In particular, in the Claus process which is widely used in petroleum refineries to convert by-product hydrogen sulfide to sulfur, large volumes of waste tail gas are generated which may contain up to about 2.0 wt. % sulfur contaminant. Directly discharging this tail gas to the atmosphere results in pollution problems, and increasing numbers of communities are requiring that the contaminant level be drastically reduced prior to discharge.

A recently developed and highly effective process, known as the Stretford Process, has been used to remove low concentrations of sulfur contaminants from the gas streams. In this process, if the sulfur contaminant is not all present as hydrogen sulfide, it is first converted to this compound by the Bevon process, for example, which utilizes catalytic hydrogenation with a cobalt-molybdenum type catalyst. The hydrogen sulfide contaminated gas stream is then contacted with an aqueous alkaline sodium carbonate-bicarbonate solution that contains salts of oxyacids of pentavalent vanadium and the salts of anthraquinone and/or hydroanthraquinone disulfonic acids (hereinafter referred to simply as A.D.A. and reduced A.D.A., respectively). Substantially all of the hydrogen sulfide is converted to elemental sulfur which is recovered. This oxidation of hydrogen sulfide occurs with a concomitant reduction of the pentavalent vanadium to tetravalent form, and some reduction of the A.D.A. may also occur. A properly treated gas stream will contain less than about 0.002 wt. % residual sulfur contaminant. After separation of the elemental sulfur, the spent aqueous sorbent containing tetravalent vanadium is regenerated with oxygen gas or air to form reactive aqueous sorbent which is recycled to the sorption step. The net effect of the cycle is the indirect oxidation of the hydrogen sulfide by oxygen gas to form water and elemental sulfur which is recovered.

In practice, the described process has been found to perform its intended function of removing substantially all of the sulfur in a waste gas stream or other gas stream extremely well. Nonetheless, there is a problem associated with this process due to the fact that as much as about 5% of the sorbed sulfur contaminant is not recovered in the form elemental sulfur but, instead, forms thiosulfate and, to a lesser extent, other water-soluble oxysulfur anions, such as sulfate. The reaction path by which thiosulfate forms is not entirely clear, but some undoubtedly is formed by the direct oxidation of the hydrosulfide ion. Another contribution may be from the known reaction of sulfur with sodium carbonate. A fraction of the thiosulfate, in turn, is converted to sulfate in the presence of A.D.A. or reduced A.D.A. and the oxygen used as regenerant. Regardless of how formed, thiosulfate and related compounds accumulate in the regenerable, reactive aqueous sorbent with adverse effects. Thus, either the periodic replacement of the entire sorbent or the withdrawal of a purge stream is required to maintain the concentration of these compounds at a tolerable level in the system. In general, sodium thiosulfate levels in excess of about 25 wt. %, as the pentahydrate, are very undesirable because both A.D.A. and the vanadate salts are largely salted out at these levels. Since either complete or partial replacement of the oxysulfur anion-loaded sorbent is, in effect, a purging of the system, the term "purge stream," as used herein, is to be understood to refer to either or both modes of replacement. It will be understood that if a purge stream of sorbent is merely taken and discarded, valuable soda, A.D.A. and vanadium compounds will be lost with the removed sorbent. More importantly, however, is that the removed thiosulfate containing sorbent presents a serious disposal problem since it has a high B.O.D. (Biological Oxygen Demand) by virtue of its high concentration of thiosulfate. This disposal problem was recognized in U.S. Pat. No. 3,904,734 which provides a method in which the purge stream is decomposed in a fluidized bed before ultimate disposal. While this process eliminates the environmental problems associated with the disposal of the purge stream, it results in the loss of valuable chemicals.

In U.S. Pat. No. 3,959,452 a process is described in which a purge stream is acidified with sulfuric or phosphoric acid to decompose thiosulfate to elemental sulfur and sulfur dioxide. After acidification, the solution is blown with steam or hot flue gas to remove substantially all of the $SO_2$ and decanted to remove flocculated sulfur. The solution is then treated with calcium hydroxide to convert substantially all of the sodium sulfate or phosphonate to sodium hydroxide and to precipitate calcium sulfate or calcium phosphate, depending on the acid utilized to decompose the thiosulfate. While this process represents an improvement over purging and disposing Stretford solution, it has been found that some losses of valuable chemicals still occur since some A.D.A. is occluded in the amorphous sulfur and some vanadium is lost because of the limited solubility of calcium vanadate.

It is an object of this invention to provide an improved method for reducing the losses of vanadium and A.D.A. in the purge stream of the Stretford process.

SUMMARY OF THE INVENTION

In accordance with the present invention, the purge stream from the Stretford process, which typically contains 20–30% sodium thiosulfate as pentahydrate, with some sodium sulfate present, about 2% sodium bicarbonate, about 0.2% vanadate, and about 0.2% A.D.A., is treated with an aqueous solution of a nickel ethylenediamine complex to precipitate out the thiosulfate according to the equation:

$$Ni(en)_3^{+2} + S_2O_3 = \rightarrow Ni(en)_3 S_2O_3 \downarrow$$

where en = ethylenediamine.

The addition of the nickel ethylenediamine complex to the Stretford solution effects the quantitative precipitation of nickel ethylenediamine thiosulfate, while none of the other Stretford constituents, i.e., A.D.A., vanadate, bicarbonate or hydroxide are precipitated as salts of nickel ethylenediamine.

The nickel ethylenediamine thiosulfate precipitate is removed from the Stretford solution by decantation or other suitable means and treated with sulfuric or phosphoric acid to produce elemental sulfur and $SO_2$ according to the equation:

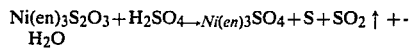

$$Ni(en)_3S_2O_3 + H_2SO_4 \rightarrow Ni(en)_3SO_4 + S + SO_2 \uparrow + H_2O$$

After removal of $SO_2$ via blowing with steam or hot flue gas, and removal of sulfur by decantation or any other suitable means, the remaining solution is treated with sufficient lime, i.e., calcium hydroxide or equivalent, to remove sulfate and regenerate the nickel ethylenediamine for reuse. This proceeds according to the equation:

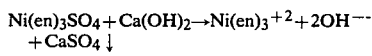

$$Ni(en)_3SO_4 + Ca(OH)_2 \rightarrow Ni(en)_3^{+2} + 2OH^- + CaSO_4 \downarrow$$

It will be appreciated that since only the nickel ethylenediamine thiosulfate which was precipitated from the Stretford solution is subjected to further treatment by acidification and causticization, the danger of occlusion of A.D.A. or of precipitation of calcium vanadate in such further treatment is eliminated.

DESCRIPTION OF SPECIFIC EMBODIMENTS

Figure 1:
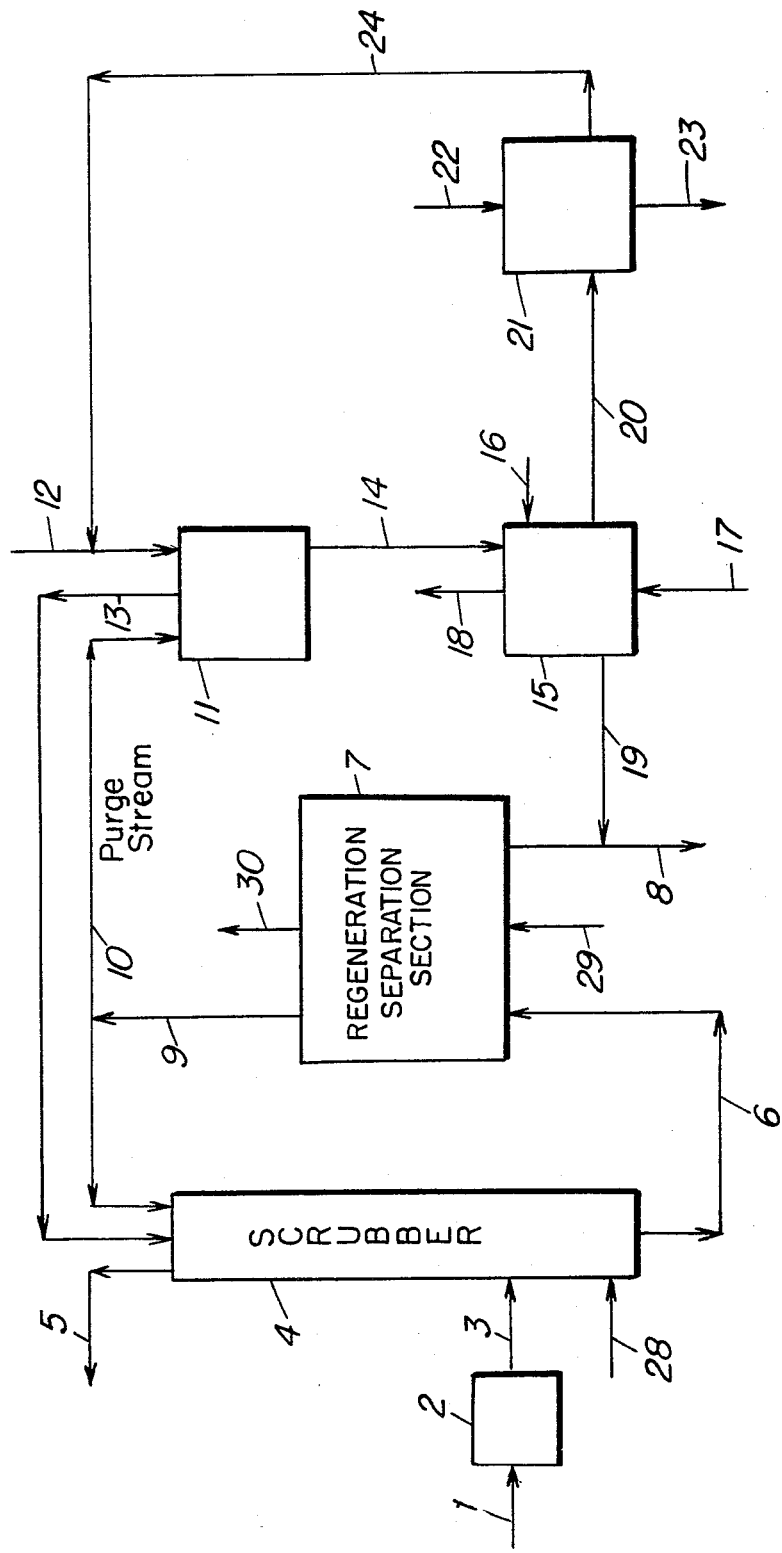
FIG. 1 is a schematic flow diagram illustrating one embodiment of the process of the present invention.

This invention will now be described by reference to FIG. 1 of the drawing. A sulfur contaminated gas stream, such as the tail gas from the Claus process, which may contain up to about 2.0 wt. % sulfur as $SO_2$, together with sufficient added hydrogen to reduce substantially all of the sulfur contaminant to hydrogen sulfide, is fed through line 1 to a catalytic reduction unit 2. The contaminated gas stream with the contaminant now in the form of hydrogen sulfide is passed via line 3 to one or more scrubber units, shown in the drawing as a single scrubber 4 where the contaminant is sorbed in the regenerable, reactive aqueous sorbent. The purified gas exits through line 5, and the aqueous sorbent and suspended sulfur passes via line 6 to a regeneration-separation section 7 from which regenerated aqueous sorbent is returned to the scrubber 4 via line 9. Air or oxygen gas is provided to the regeneration-separation section 7 via line 29 and unconsumed oxygen, if any, and/or nitrogen are vented via line 30. Make-up water, soda ash and vanadium salts, and acids that may be needed to adjust pH of the sorbent, are introduced as needed to the scrubber section 4 via line 28. Sulfur is recovered from the regeneration-separation section 7 via line 8. A purge stream, which may be drawn off from line 6 but is preferably drawn from line 9 as shown, is passed via line 10 to a vessel 11. A nickel ethylenediamine complex is introduced via line 12 in sufficient quantity to precipitate out substantially all of the thiosulfate as nickel ethylenediamine thiosulfate. The nickel ethylenediamine complex is formed, in aqueous solution, by the addition of ethylenediamine to a soluble nickel salt. Non limiting examples of suitable nickel salts include $Ni(NO_3)_2 \cdot 6H_2O$ and $NiCl_2 \cdot 6H_2O$.

The Stretford solution is separated from the nickel ethylenediamine thiosulfate precipitate by decantation or any other suitable means and is returned to the scrubber via line 13. The precipitate is withdrawn from vessel 11 and passed via line 14 to neutralizer 15. Sulfuric or phosphoric acid is introduced to the neutralizer via line 16 in sufficient quantity to decompose substantially all of the thiosulfate. The acidified mixture is then blown with steam or hot flue gas introduced via line 17 to strip it of sulfur dioxide which exits via line 18.

In treatment of the acidified precipitate to strip it of sulfur dioxide, it is important to treat with steam, hot flue gas, or by boiling, under such conditions of time and temperature so as to remove substantially all sulfur dioxide since otherwise the consumption of lime in the subsequent step will be increased. Moreover, the amount of insoluble calcium salts formed in the subsequent step will be greatly increased, thus presenting a disposal problem.

The $SO_2$ so separated from the acidified precipitate is preferably recycled to the Claus plant when the process of this invention is used to purify the tail gas from such a plant. Alternatively, it may be vented when feasible, or reduced with hydrogen to $H_2S$ and recycled to the scrubber Flocculated sulfur is removed via line 19 by decantation or any other suitable means and may be added to the sulfur recovered via line 8. The acidified precipitate, consisting of nickel ethylenediamine sulfate or phosphate, is passed via line 20 to causticizer 21.

Sufficient lime, i.e., calcium hydroxide or equivalent, is added via line 22 to neutralize the acid added via line 16 and to precipitate out the sulfate or phosphate. It will be appreciated that CaO or $Ca(OH)_2$, BaO or $Ba(OH)_2$, or MgO or $Mg(OH)_2$ can be employed to precipitate out the sulfate or phosphate. Preferred is calcium oxide or calcium hydroxide. Insoluble calcium sulfate and/or phosphate is removed via line 23 for disposal. A solution containing regenerated nickel ethylenediamine ion is drawn off via line 24 for reintroduction to vessel 11.

The following examples show the efficacy of the various steps of the process of the present invention:

EXAMPLE 1

Solubility of Salts of Nickel Ethylenediamine

An aqueous solution of nickel ethylenediamine nitrate was prepared by adding ethylenediamine to a 20% nickel nitrate solution until the color changed from green to violet. In order to test the solubility of nickel ethylenediamine salts of each the various Stretford constituents, an amount of each of the following solutions was added to an amount of the nickel ethylenediamine nitrate solution prepared above in an equal volume basis. The results were as follows:

| Solution Added to Nickel Ethylenediamine Nitrate Solution | Result |
|---|---|
| 20% $Na_2S_2O_3$ | Precipitate formed |
| 20% NaOH | Soluble |
| 2% $NaHCO_3$ | Soluble |
| 5% $Na_2SO_4$ | Soluble |
| 0.28% $NH_4VO_3$ (2 gram V 1 liter) | Soluble |
| 20% $Na_2CO_3$ | Soluble |
| 70% $Na_2SO_3$ | Soluble |
| 0.2% 2, 7 A.D.A. | Soluble |

Since the only chance for the loss of the Stretford constituents A.D.A., vanadate, bicarbonate or hydroxide when a Stretford solution is treated with a nickel ethylenediamine complex is by their precipitation as nickel ethylenediamine salts, the above data indicates that with the present process no Stretford constituents would be lost since they do not form precipitates with nickel ethylenediamine ions.

EXAMPLE 2

Precipitation of Thiosulfate from Actual Stretford Solution

Stretford solution from a commercial Stretford plant (35 cc, 44.45 g) containing 15.2 wt. % sodium thiosulfate, as determined by $KI/KIO_3$ titration, was treated with a stoichiometric amount of $Ni(en)_3^{+2}$ as an aqueous solution of $Ni(en)_3(NO_3)_2$ from Example 1. Contacting time was approximately 10 to 15 minutes, at room temperature. A precipitate, $Ni(en)_3 S_2O_3$ (15.61 g) was recovered. This is the equivalent of 15.8 wt. % $Na_2S_2O_3$ which shows that the thiosulfate is precipitated quantitatively.

EXAMPLE 3

Conversion to $Ni(en)_3 S_2O_3$ to Sulfur and Sulfur Dioxide and Regeneration of Nickel Complex A portion of the precipitate from Example 2 (25 g) was added to an excess of 20% sulfuric acid at room temperature. A large quantity of sulfur was formed with concomitant evolution of sulfur dioxide. The sulfur was removed by filtration. The filtrate, which was green in color, was treated with lime to precipitate $CaSO_4$ and restore pH. The treatment with lime also changes the color of the filtrate to purple which is indicative of complexed nickel.

After the $CaSO_4$ was removed from the purple filtrate, a 20% $Na_2S_2O_3$ solution was added. $Ni(en)_3 S_2O_3$ was again precipitated showing that the nickel ethylenediamine complex can be regenerated and reused.

Although this invention has been described with reference to the Stretford process as it is currently practiced, it is to be understood that this invention is applicable to variants of the process which also utilize a regenerable, reactive aqueous sorbent. For example, other redox metal-containing couples may be substituted for the vanadate salts which provides the pentavalent-tetravalent vanadium couple or of other oxygen-transfer organic redox coupled for the A.D.A. or combinations of these with one another, in an aqueous alkaline medium, provided these form a regenerable, reactive aqueous sorbent. Among the metal-containing couples contemplated are those provided by the appropriate oxyanions of metals of group VB and group VIB of the period table, and the oxyanions of arsenic which exists in the trivalent and pentavalent state. Iron, in which the ferrous-ferric transition exists, also may be used, provided it is used in the presence of a sequestering agent to prevent precipitation of iron oxide. In addition to the sodium salt of A.D.A., (usually the sodium salt of anthraquinone 2:7 disulfonic acid), other oxygen-transfer organic redox couples containing the anthraquinone or naphthaquinone structure may be used. Furthermore, the organic redox couple may be used in the absence of a redox metal-containing couple, although this tends to make excessive amounts of thiosulfate. In addition to the reactive reagents and alkaline salts, additives such as citrate or tartrate salts and/or phosphate salts as described in British Patent No. 948,270 for example, may be present in the reactive, regenerable aqueous sorbent. It is to be understood, of course, that the contemplated reactant reagents are those that remain soluble through the complete cycle, i.e., the reaction and regeneration steps, since otherwise occlusion by elemental sulfur and loss of reagent results. With all of the contemplated variants of the sorbent, one would expect, to a greater or lesser degree, that the hydrogen sulfide would react to form greater or lesser amounts of thiosulfate along with elemental sulfur, and that the disposal problem would be substantially ameliorated by the use of the present invention.

What is claimed is:

1. In the process of purifying a hydrogen sulfide contaminated gas by indirectly oxidizing the hydrogen sulfide with oxygen gas to form elemental sulfur and purified gas, which process comprises recycling a reactive, regenerable aqueous sorbent comprising sodium salts of anthraquinone disulfonic acid and an oxyanion of vanadium as means for effecting said indirect oxidation, and wherein a stream of said recycled aqueous sorbent containing thiosulfate is purged; the improvement comprising removing thiosulfate from said purge stream by:
(a) treating said purge stream with a nickel ethylenediamine complex forming a precipitate of insoluble nickel ethylenediamine thiosulfate without precipitation of anthraquinone disulfonic acid or vanadate;
(b) separating said aqueous sorbent from said insoluble precipitate and returning said sorbent to said recycling step;
(c) acidifying said precipitate with sulfuric or phosphoric acid whereby decomposing thiosulfate;
(d) alkalizing the acidified precipitate whereby forming a precipitate of insoluble salts;
(e) recovering a regenerated nickel ethylenediamine complex; and
(f) recycling the regenerated nickel ethylenediamine complex to be used in treating said purge stream.

* * * * *